US008866921B2

United States Patent
Williams

(10) Patent No.: US 8,866,921 B2
(45) Date of Patent: Oct. 21, 2014

(54) DEVICES AND METHODS INVOLVING ENHANCED RESOLUTION IMAGE CAPTURE

(75) Inventor: Rodney Owen Williams, Cary, NC (US)

(73) Assignee: HTC Corporation, Taoyuan County, Taoyuan (TW)

( * ) Notice: Subject to any disclaimer, the term of this patent is extended or adjusted under 35 U.S.C. 154(b) by 43 days.

(21) Appl. No.: 13/533,047

(22) Filed: Jun. 26, 2012

(65) Prior Publication Data
US 2013/0342718 A1 Dec. 26, 2013

(51) Int. Cl.
*H04N 5/225* (2006.01)
*H04N 5/262* (2006.01)
(52) U.S. Cl.
USPC ........................................ 348/218.1; 348/239
(58) Field of Classification Search
USPC ................... 348/218.1, 221.1, 239, 362, 367; 396/89, 268; 382/105, 112, 171, 382/121–127
See application file for complete search history.

(56) References Cited

U.S. PATENT DOCUMENTS

| | | | |
|---|---|---|---|
| 8,405,763 B2 * | 3/2013 | Veeraraghavan et al. | 348/367 |
| 2010/0265313 A1 * | 10/2010 | Liu et al. | 348/36 |
| 2011/0037894 A1 * | 2/2011 | Sbaiz | 348/441 |
| 2012/0069141 A1 * | 3/2012 | Sim et al. | 348/36 |
| 2012/0105690 A1 * | 5/2012 | Waqas et al. | 348/252 |
| 2012/0120188 A1 * | 5/2012 | Arai et al. | 348/36 |

* cited by examiner

*Primary Examiner* — Kelly L Jerabek
(74) *Attorney, Agent, or Firm* — McClure, Qualey & Rodack, LLP

(57) ABSTRACT

Devices and methods involving enhanced resolution image capture are provided. A representative electronic device includes: an image capture sensor having a plurality of pixels, the image capture sensor being operative to acquire a frame of image information by converting light incident upon the pixels during an exposure duration into electrical signals; and an image capture system selectively operative in a first image capture mode and a second image capture mode; in the first image capture mode, the image capture system outputs an image corresponding to a single frame of image information acquired during a single exposure duration; and in the second image capture mode, the image capture system outputs an enhanced image corresponding to frames of image information acquired during multiple exposure durations such that the enhanced image exhibits a higher resolution than a resolution exhibited by the acquired image associated with the first mode.

10 Claims, 5 Drawing Sheets

DEVICES AND METHODS INVOLVING ENHANCED RESOLUTION IMAGE CAPTURE

TECHNICAL FIELD

The present disclosure generally relates to image capture and processing.

DESCRIPTION OF THE RELATED ART

Image capture devices (e.g., digital cameras) use image sensors to acquire image data. Examples of such image sensors are charge coupled device (CCD) sensors and complementary metal oxide semiconductor (CMOS) sensors, each of which use sensor pixels that convert incident light into electrical signals. Notably, pixel density of an image sensor is highly correlated to price, with sensors of higher pixel density being more expensive than those of lower pixel density.

SUMMARY

Briefly described, one embodiment, among others, is an electronic device comprising: an image capture sensor having a plurality of pixels, the image capture sensor being operative to acquire a frame of image information by converting light incident upon the pixels during an exposure duration into electrical signals; and an image capture system selectively operative in a first image capture mode and a second image capture mode; in the first image capture mode, the image capture system outputs an image corresponding to a single frame of image information acquired during a single exposure duration; and in the second image capture mode, the image capture system outputs an enhanced image corresponding to frames of image information acquired during multiple exposure durations such that the enhanced image exhibits a higher resolution than a resolution exhibited by the acquired image associated with the first mode.

Another embodiment is a method for enhancing resolution of a captured image comprising: acquiring multiple frames of image information corresponding to a scene using pixels of an image capture sensor; designating one of the multiple frames of image information as a reference frame; and processing the reference frame to provide an enhanced image such that the enhanced image exhibits a higher resolution than a resolution exhibited by the reference frame.

Another embodiment is a computer-readable medium having stored thereon computer-executable instructions, which, when executed by a computer processor, enable performance of the method comprising: acquiring multiple frames of image information corresponding to a scene using pixels of an image capture sensor; designating one of the multiple frames of image information as a reference frame; and processing the reference frame to provide an enhanced image such that the enhanced image exhibits a higher resolution than a resolution exhibited by the reference frame.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4A is a schematic diagram depicting a portion of a true image.

FIG. 4B is a schematic diagram depicting a low resolution pixel output of the prior art corresponding to the true image of FIG. 4A.

DETAILED DESCRIPTION

Figure 1A:
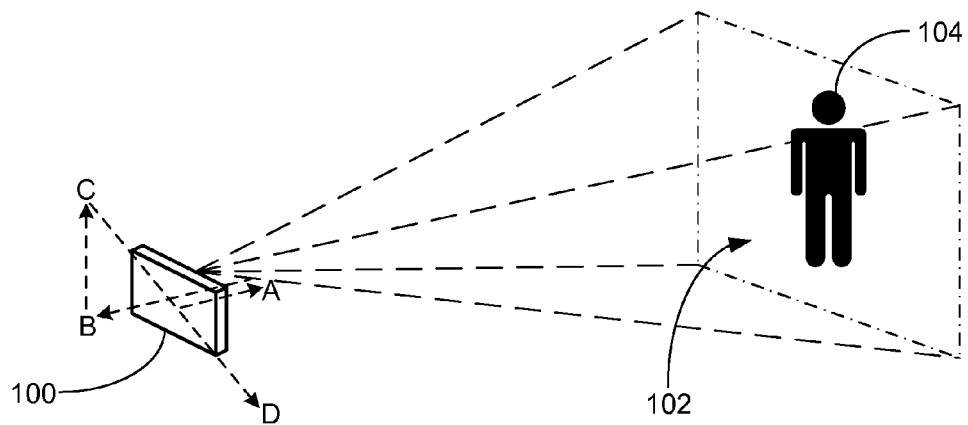
FIG. 1A is a schematic diagram of an exemplary embodiment of an electronic device being used to acquire image information.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

Devices and methods involving enhanced resolution image capture are provided that, in some embodiments, involves the use of smartphones that include onboard cameras. By way of example, a smartphone may incorporate an image capture system that is selectively operative in a standard resolution mode and an enhanced resolution mode. In the enhanced resolution mode, the image capture system outputs an enhanced image corresponding to frames of image information acquired during multiple exposure durations. In some embodiments, the frames of image information are acquired as the device is being moved so that minor variations attributable to variations in point of view are present in the acquired images. Notably, the enhanced image is processed to exhibit a higher resolution (particularly at locations on the image that are identified as having edges with significant contrast) than a resolution exhibited by an image associated with the standard resolution mode.

In this regard, FIG. 1A is a schematic diagram of an exemplary embodiment of an electronic device being used to acquire image information. As shown in FIG. 1A, device 100 (e.g., a mobile device) acquires image information associated with a scene 102, which includes a person 104. In acquiring the image information, device 100 operates in an enhanced resolution mode, in which multiple frames of image information are used to provide an output image that exhibits a higher pixel resolution (such as on portions of the image where significant edge contrast is detected) than that of the image capture sensor (not shown) used to acquire the image information. This is in contrast to operating in a standard resolution mode, in which a single frame of image information is used to provide an output image.

In FIG. 1A, device 100 is moved by the user and/or by camera automation during image capture (such as through points A, B, C and D as shown by the dashed lines). This results in the frames of image information being acquired from different points of view.

Figure 1B:
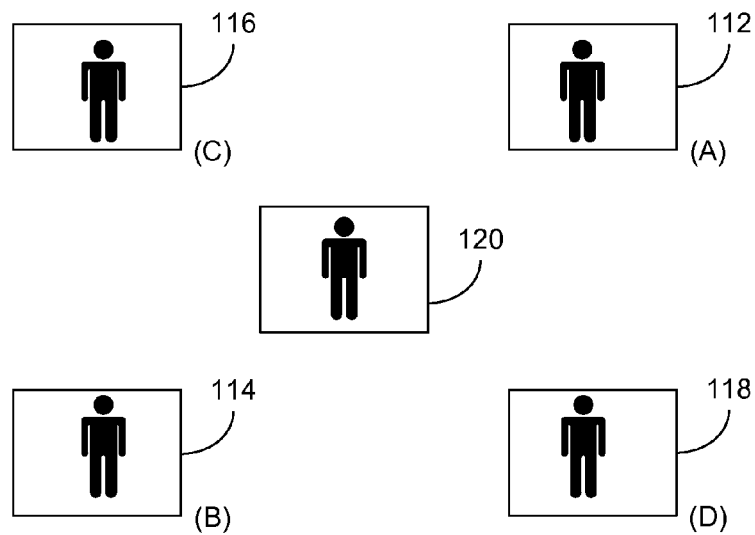
FIG. 1B is a schematic diagram of representative image information acquired using the embodiment of FIG. 1A.

FIG. 1B is a schematic diagram of representative image information acquired using the embodiment of FIG. 1A. In FIG. 1B, frames of image information associated with points of view A, B, C and D (frames 112, 114, 116 and 118, respectively), as well as the frame of image information associated with the original position of the device (reference frame 120), are depicted. It should be noted that various numbers of frames of image information may be acquired and there is no intention to limit the concept to the depicted number or the particular movements of the device shown in FIG. 1A in order to provide the various points of view.

In reference frame 120, person 104 is relatively centered within the frame, whereas, in frame 112, the person is slightly offset down and to the left. In contrast, the person is offset up and to the right in frame 114, down and to the right in frame 116, and up and to the left in frame 118. As will be described in greater detail, the offsets associated with the multiple frames of image information are used for modifying the reference frame to produce an enhanced image. It should be noted that the illustration may be considered an exaggeration of the offsets actually required.

Figure 2:
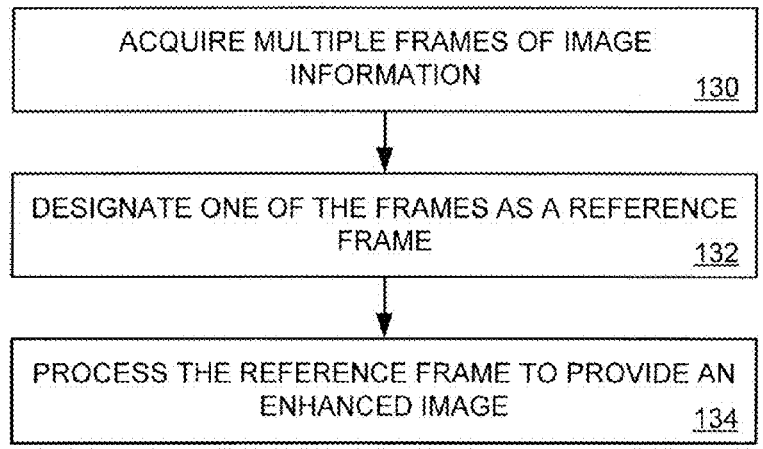
FIG. 2 is a flowchart depicting an exemplary embodiment of a method for enhancing resolution of a captured image.

FIG. 2 is a flowchart depicting an exemplary embodiment of a method for enhancing resolution of a captured image. As shown in FIG. 2, the method may be construed as beginning at block 130, in which multiple frames of image information corresponding to a scene are acquired using pixels of an image capture sensor. In block 132, one of the multiple frames of image information is designated as a reference frame. Then, as depicted in block 134, the reference frame is processed to provide an enhanced image. Notably, the enhanced image exhibits a higher resolution (e.g., in the portions of the image that have detectable edge contrast) than a resolution exhibited by the reference frame.

Figure 3:
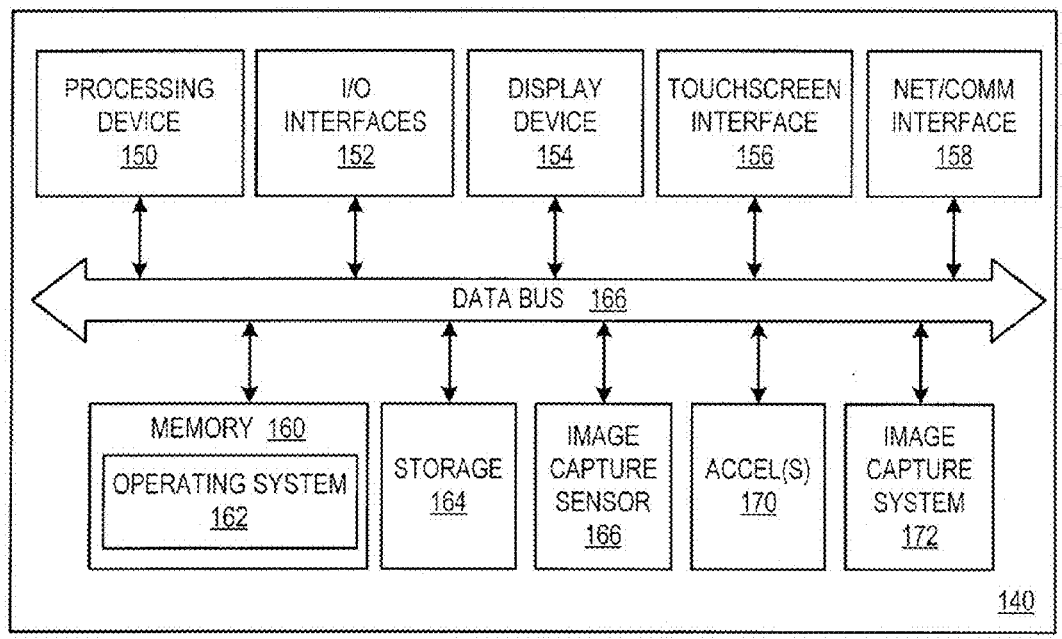
FIG. 3 illustrates an exemplary embodiment of an electronic device that may be used for implementing an image capture system.

FIG. 3 illustrates an exemplary embodiment of an electronic device that may be used for implementing an image capture system. As described earlier, electronic device 140 may be embodied as a smartphone but may also be embodied in any one of a wide variety of devices. As shown in FIG. 3, device 140 includes a processing device (processor) 150, input/output interfaces 152, a display device 154, a touchscreen interface 156, a network/communication interface 158, a memory 160, an operating system 162 and a mass storage 164, with each communicating across a local data bus 166. Additionally, device 140 incorporates an image capture sensor 166, one or more accelerometers 170 and an image capture system 172.

The processing device 150 may include a custom made or commercially available processor, a central processing unit (CPU) or an auxiliary processor among several processors associated with the device 140, a semiconductor based microprocessor (in the form of a microchip), one or more application specific integrated circuits (ASICs), a plurality of suitably configured digital logic gates, and other electrical configurations comprising discrete elements both individually and in various combinations to coordinate the overall operation of the system.

The memory 160 may include any one of a combination of volatile memory elements (e.g., random-access memory (RAM, such as DRAM, and SRAM, etc.)) and nonvolatile memory elements. The memory typically comprises native operating system 162, one or more native applications, emulation systems, or emulated applications for any of a variety of operating systems and/or emulated hardware platforms, emulated operating systems, etc. For example, the applications may include application specific software which may comprise some or all the components of the device 140. In accordance with such embodiments, the components are stored in memory and executed by the processing device.

Touchscreen interface 156 is configured to detect contact within the display area of the display 154 and provides such functionality as on-screen buttons, menus, keyboards, soft keys, etc. that allows users to navigate user interfaces by touch. The accelerometer(s) 170 are configured to detect motion of the device.

One of ordinary skill in the art will appreciate that the memory may, and typically will, comprise other components which have been omitted for purposes of brevity. Note that in the context of this disclosure, a non-transitory computer-readable medium stores one or more programs for use by or in connection with an instruction execution system, apparatus, or device. With further reference to FIG. 3, network/communication interface 158 comprises various components used to transmit and/or receive data over a networked environment. When such components are embodied as an application, the one or more components may be stored on a non-transitory computer-readable medium and executed by the processing device.

FIG. 4A is a schematic diagram depicting a portion of a true image. Specifically, image 180 represents a portion of a scene that is comparable in size to a low resolution pixel of an image capture sensor. As such, if the low resolution pixel had infinite resolution, image 180 would be captured by the pixel. Note that image 180 includes darkener portions 182 and 184 positioned at the upper right and lower left corners, respectively, as well as lighter portions 186 and 188 positioned at the upper left and lower right corners, respectively.

Even though high contrast is exhibited by image 180, the low resolution pixel provides an output corresponding to an average value of light incident upon the pixel. As such, the low resolution pixel output 190 (FIG. 4B) of the pixel in a standard (low resolution) mode exhibits a uniform gray-scale color.

Figure 4C:
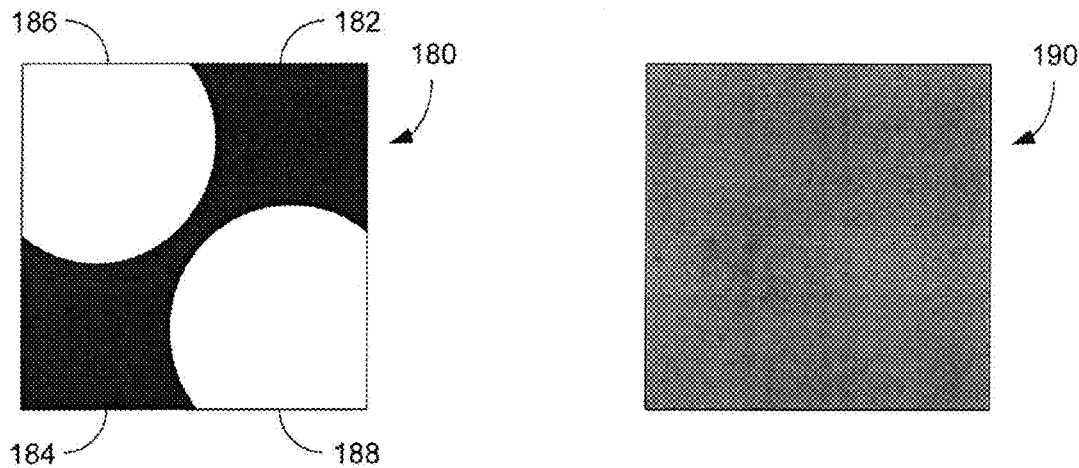
FIG. 4C is a schematic diagram depicting image pixels of an enhanced image that correspond to the true image.
Figure 4C:
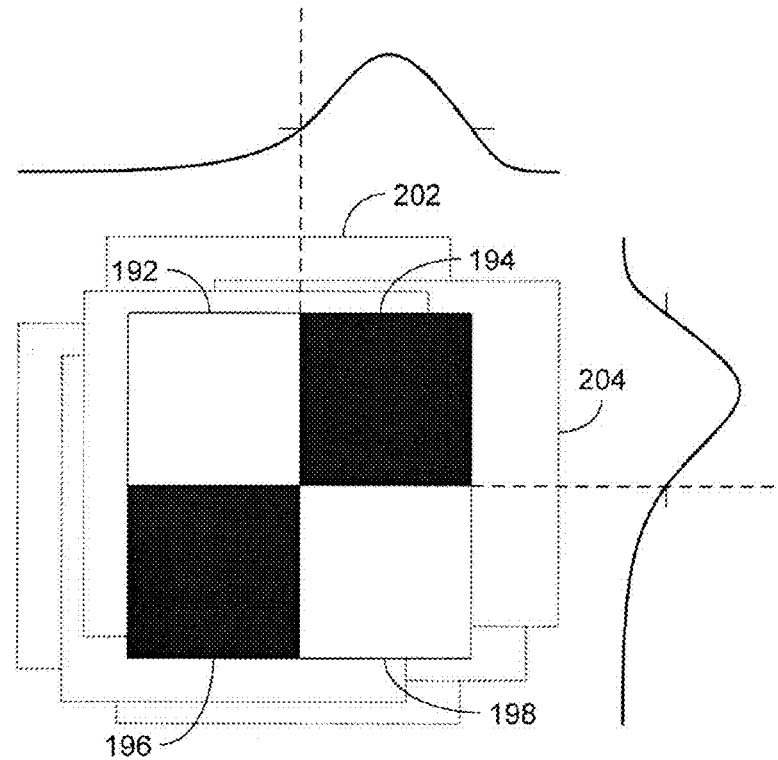

In contrast, FIG. 4C is a schematic diagram depicting image pixels of an enhanced image that correspond to the image 180 of FIG. 4A. As shown in FIG. 4C, in this embodiment, image pixels 192, 194, 196 and 198 provide an improved resolution of four times that provided by the low resolution pixel output. It should be noted that in other embodiments image pixels may be provided in ratios other that 4:1.

In order to provide the image pixels, values for the image pixels are calculated using the image information acquired during multiple exposure durations of the image capture sensor. Representations of portions of other frames of image information (e.g., portions 202 and 204) acquired during the multiple exposure durations are depicted in dashed lines. Notably, the relative orientations of these other frames are intended to demonstrate the offsets of the contents of the image information attributable to the changes in the points of view during image capture.

The values calculated for the image pixels are then attributed to an enhanced image. In this embodiment, the values of the image information are combined and mapped to corresponding image pixels.

In generating the enhanced image, a frame of image information acquired during the multiple exposure durations is designated as a reference frame. In some embodiments, the first frame captured during the multiple exposure durations is used as the reference frame. Image information associated with other frames acquired during the multiple exposure durations is then used to modify the image information of the reference frame. By way of example, the image information may be virtually aligned with the image of the reference frame and accumulated pixel values for the frames may be used to calculate values for the image pixels.

As shown in FIG. 4C, this may be accomplished by setting an edge detection threshold (indicated by the hash marks located along the respective graphs) so that when the combined input corresponds to the threshold, an edge is identified. In this case, the inputs identify the edges of image pixel 194. As such, the enhanced image is generated to exhibit a pixel resolution corresponding to the number of calculated image pixels.

Given that the edge detection may be analyzed in successive frames of the equivalent sensor pixel, that is, the pixel which is detecting nearly the same image position as that in the reference frame, it is evident that the amount of camera or sensor movement need only be an amount sufficient to shift the contrast edge of the image a portion of a low resolution pixel. The motion may be provided by the camera operator and/or motion automation, not unlike that of autofocus camera movements.

Figure 5:
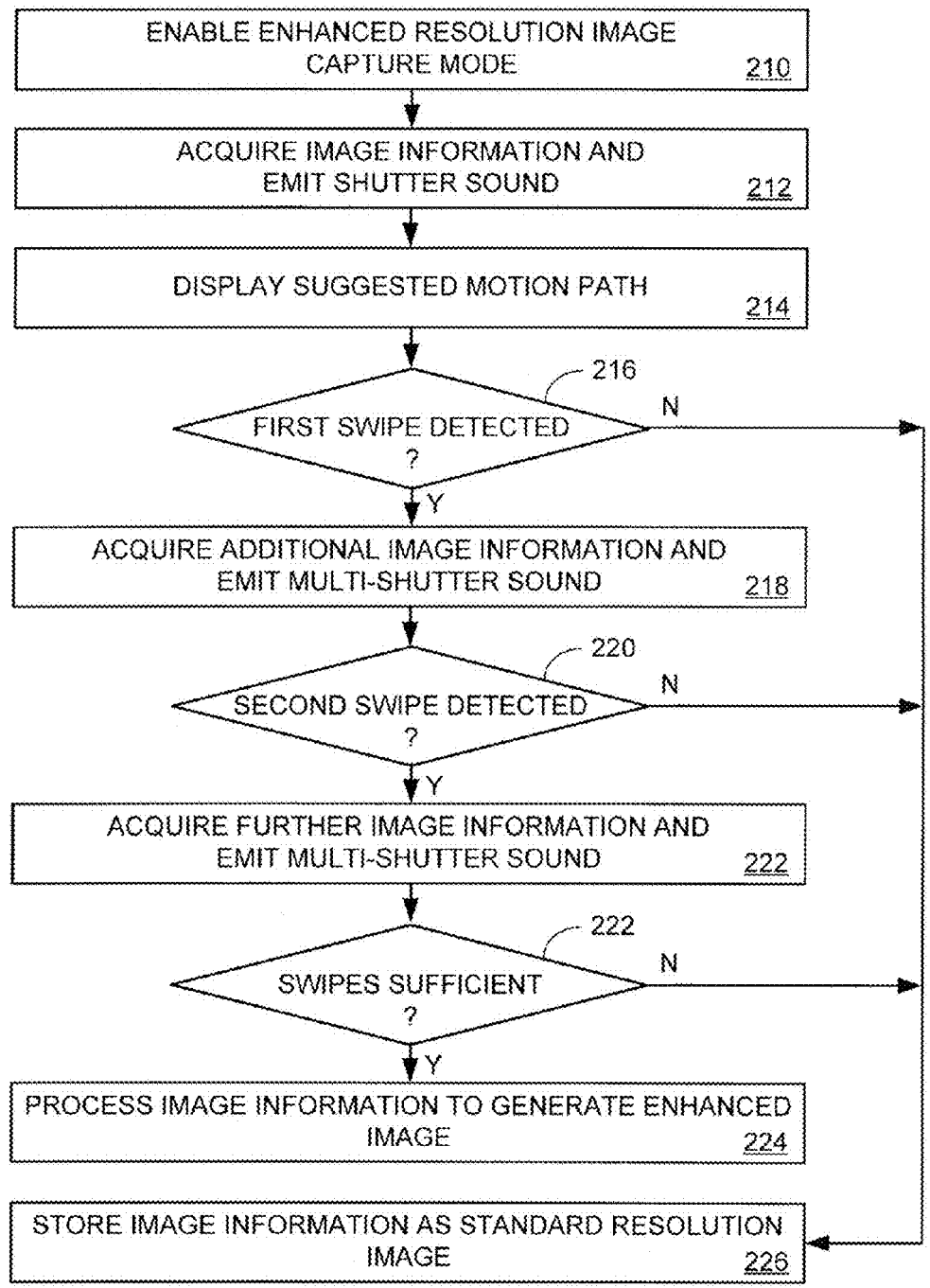
FIG. 5 is a flowchart depicting another exemplary embodiment of a method for enhancing resolution of a captured image.

FIG. 5 is a flowchart depicting another exemplary embodiment of a method for enhancing resolution of a captured image that may be performed by an electronic device (e.g., device 100 of FIG. 1). As shown in FIG. 5, the method may be construed as beginning at block 210, in which an enhanced resolution image capture mode of a device is enabled. In some embodiments, this may involve user interaction with the device, such as by actuating a button or selecting a mode of operation from a menu, among possible others. In block 212, image information is acquired responsive to the user actuating the shutter of the device. In some embodiments, a shutter sound may be emitted. Thereafter, such as depicted in block 214, a suggested motion path along which the user may move the device is displayed via a display of the device.

In block 216, a determination is made as to whether a first swipe (i.e., motion of the device) is detected. If a first swipe is detected, additional frames of image information are acquired during the detected motion. In some embodiments, a multi-shutter sound may be emitted. Then, in block 218, a determination is made as to whether a second swipe is detected. If a second swipe is detected, further frames of image information are acquired during the detected motion that may be accompanied by a multi-shutter sound.

In block 222, a determination is made as to whether the detected motion was sufficient to provide the desired varying points of view during image capture. If the detected motion was sufficient, the process may proceed to block 224, in which image information is processed to generate an enhanced image. If however, the detected motion was insufficient, the enhanced image may not be generated and one or more of the frames of acquired image information may be stored as standard resolution images. This result may also be provided responsive to negative determinations in each of blocks 216 and 220. In the case where the camera performs the motion path automatically, the user feedback may not be necessary.

Figure 6A:
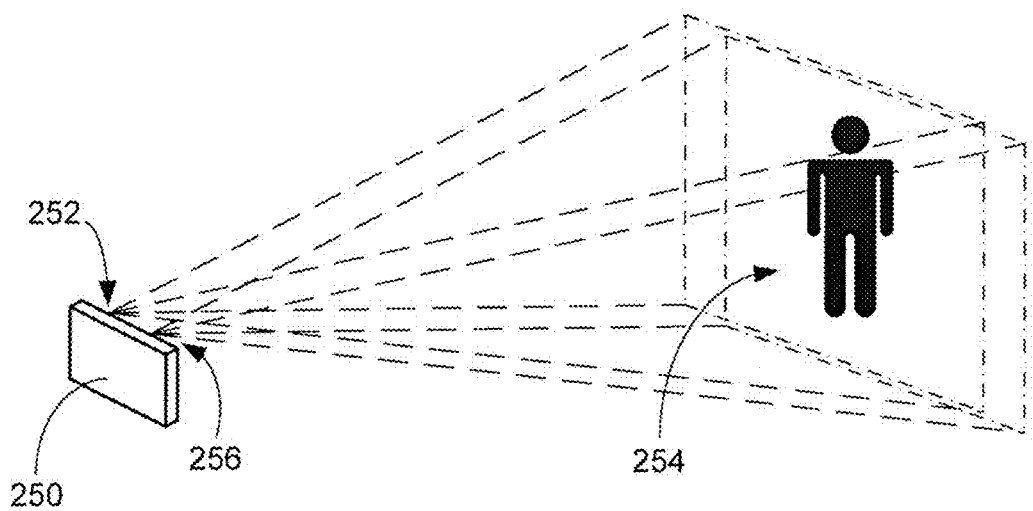
FIG. 6A is a schematic diagram of another exemplary embodiment of an electronic device being used to acquire image information.

FIG. 6A is a schematic diagram of another exemplary embodiment of an electronic device being used to acquire image information. As shown in FIG. 6A, device 250 is configured with multiple apertures (in this case two such apertures), with each being oriented to capture image information from a slightly different point of view than the other. Specifically, aperture 252 is oriented to capture image information from scene 254 that is offset slightly up and to the left when compared to the image information captured via aperture 256.

Figure 6B:
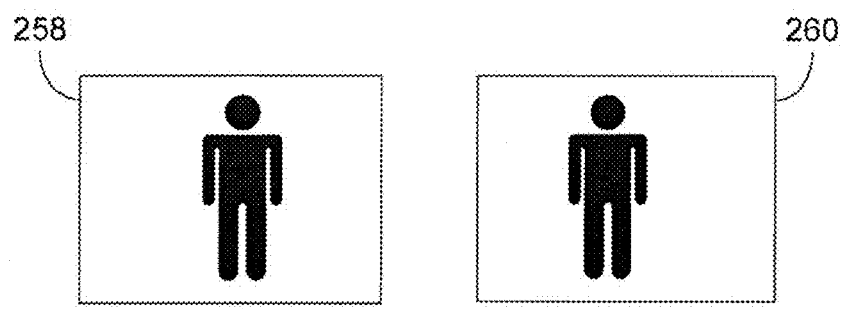
FIG. 6B is a schematic diagram of representative image information acquired using the embodiment of FIG. 6A.

FIG. 6B is a schematic diagram of representative frames of image information acquired using the embodiment of FIG. 6A. Specifically, frame 258 is associated with aperture 252 and frame 260 is associated with aperture 256. Due to the offset in the image information, an enhanced image may be generated using less motion of the device than that required by a device utilizing only one aperture.

If embodied in software, it should be noted that each block depicted in the flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as device 140 shown in FIG. 3. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for enhancing resolution of a captured image comprising:
   acquiring multiple frames of image information corresponding to a scene using pixels of an image capture sensor;
   designating one of the multiple frames of image information as a reference frame; and
   processing the reference frame to provide an enhanced image such that the enhanced image exhibits a higher resolution than a resolution exhibited by the reference frame,
   wherein acquiring multiple frames of image information comprises acquiring at least one of the frames from a different point of view than a point of view associated with the reference frame, and wherein processing the reference frame comprises performing edge detection.

2. The method of claim 1, wherein the resolution exhibited by the enhanced image exceeds a pixel resolution of the image capture sensor.

3. The method of claim 1, wherein processing the reference frame comprises:
   associating multiple image pixels with each of the plurality of pixels of the image capture sensor;

calculating values for the image pixels using the image information acquired during the multiple exposure durations; and attributing the values calculated for the image pixels to the enhanced image such that the enhanced image exhibits a pixel resolution corresponding to the number of image pixels.

4. The method of claim 1, wherein:

the method further comprises detecting motion associated with the image capture sensor during acquisition of the multiple frames of image information; and acquiring at least one of the frames from a different point of view comprises acquiring the at least one of the frames while motion associated with the image capture sensor is detected.

5. The method of claim 1, wherein acquiring multiple frames of image information comprises:

selectively permitting light propagating along a first optical path to be incident upon the image capture sensor; and selectively permitting light propagating along a second optical path to be incident upon the image capture sensor.

6. The electronic device of claim 1, wherein a displayed suggested motion path suggests movement of the electronic device in a bi-directional manner.

7. The electronic device of claim 1, wherein a displayed suggested motion path comprises a displayed "X" pattern, the "X" pattern suggesting the movement of the electronic device.

8. A computer-readable medium having stored thereon computer-executable instructions, which, when executed by a computer processor, enable performance of the method comprising:

acquiring multiple frames of image information corresponding to a scene using pixels of an image capture sensor;

designating one of the multiple frames of image information as a reference frame; and processing the reference frame to provide an enhanced image such that the enhanced image exhibits a higher resolution than a resolution exhibited by the reference frame, wherein acquiring multiple frames of image information comprises acquiring at least one of the frames from a different point of view than a point of view associated with the reference frame, and wherein processing the reference frame comprises performing edge detection.

9. The computer-readable medium of claim 8, wherein processing the reference frame comprises:

associating multiple image pixels with each of the plurality of pixels of the image capture sensor;

calculating values for the image pixels using the image information acquired during the multiple exposure durations; and attributing the values calculated for the image pixels to the enhanced image such that the enhanced image exhibits a pixel resolution corresponding to the number of image pixels.

10. An apparatus for enhancing resolution of a captured image comprising:

acquiring logic including integrated circuitry for acquiring multiple frames of image information corresponding to a scene using pixels of an image capture sensor;

designating logic including integrated circuitry for designating one of the multiple frames of image information as a reference frame; and processing logic including integrated circuitry for processing the reference frame to provide an enhanced image such that the enhanced image exhibits a higher resolution than a resolution exhibited by the reference frame, wherein acquiring multiple frames of image information comprises acquiring at least one of the frames from a different point of view than a point of view associated with the reference frame, and wherein processing the reference frame comprises performing edge detection.

* * * * *